United States Patent
Sasagawa

(10) Patent No.: US 11,200,410 B2
(45) Date of Patent: Dec. 14, 2021

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Shigekazu Sasagawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 277 days.

(21) Appl. No.: 16/282,307

(22) Filed: Feb. 22, 2019

(65) Prior Publication Data
US 2020/0089944 A1    Mar. 19, 2020

(30) Foreign Application Priority Data
Sep. 14, 2018  (JP) .............................. JP2018-172599

(51) Int. Cl.
   *G06K 9/00* (2006.01)
   *G06K 9/34* (2006.01)

(52) U.S. Cl.
   CPC ..... *G06K 9/00422* (2013.01); *G06K 9/00449* (2013.01); *G06K 9/00463* (2013.01); *G06K 9/344* (2013.01)

(58) Field of Classification Search
None
See application file for complete search history.

(56) References Cited

U.S. PATENT DOCUMENTS

| | | | | | |
|---|---|---|---|---|---|
| 5,455,875 | A | * | 10/1995 | Chevion | G06K 9/033 382/311 |
| 5,511,135 | A | * | 4/1996 | Rhyne | G06K 9/033 382/187 |
| 5,550,930 | A | * | 8/1996 | Berman | G06K 9/033 382/187 |
| 5,850,480 | A | * | 12/1998 | Scanlon | G06K 9/723 382/229 |
| 5,923,793 | A | * | 7/1999 | Ikebata | G06K 9/00409 382/311 |

(Continued)

FOREIGN PATENT DOCUMENTS

| | | |
|---|---|---|
| JP | H0636066 | 2/1994 |
| JP | 2015049653 | 3/2015 |

OTHER PUBLICATIONS

Rasmussen, Luke V., et al. "Development of an optical character recognition pipeline for handwritten form fields from an electronic health record." Journal of the American Medical Informatics Association 19.e1 (2012): e90-e95. (Year: 2012).*

(Continued)

*Primary Examiner* — Samah A Beg
(74) *Attorney, Agent, or Firm* — JCIPRNET

(57) ABSTRACT

An information processing apparatus includes a receiving unit and a controller. The receiving unit receives an extraction-area image indicating an extraction area. The extraction area includes a fill-in area in which a writer handwrites information. When an instruction to correct a recognition result for the information written in the fill-in area indicated by the extraction-area image is given, the controller causes a display unit to display a different extraction-area image similar to the extraction-area image.

13 Claims, 12 Drawing Sheets

(56) References Cited

U.S. PATENT DOCUMENTS

| | | | | |
|---|---|---|---|---|
| 5,933,531 | A * | 8/1999 | Lorie | G06K 9/033 |
| | | | | 345/108 |
| 6,618,697 | B1 * | 9/2003 | Kantrowitz | G06F 40/253 |
| | | | | 703/22 |
| 7,096,425 | B1 * | 8/2006 | Takahashi | G06F 40/174 |
| | | | | 715/222 |
| 7,137,076 | B2 * | 11/2006 | Iwema | G06K 9/00436 |
| | | | | 715/863 |
| 9,424,242 | B2 * | 8/2016 | Blau | G06F 40/174 |
| 10,726,250 | B2 * | 7/2020 | Schild | G10L 13/00 |
| 2002/0165873 | A1 * | 11/2002 | Kwok | G06K 9/00872 |
| | | | | 715/268 |
| 2004/0057619 | A1 * | 3/2004 | Lim | G06K 9/033 |
| | | | | 382/182 |
| 2006/0062459 | A1 * | 3/2006 | Saito | G06K 9/6835 |
| | | | | 382/181 |
| 2007/0230790 | A1 * | 10/2007 | Tonouchi | G06K 9/6255 |
| | | | | 382/187 |
| 2007/0286497 | A1 * | 12/2007 | Podilchuk | G06K 9/6206 |
| | | | | 382/218 |
| 2009/0136135 | A1 * | 5/2009 | Eom | G06K 9/325 |
| | | | | 382/181 |
| 2009/0279782 | A1 * | 11/2009 | Wu | G06K 9/723 |
| | | | | 382/189 |
| 2009/0304283 | A1 * | 12/2009 | Predovic | G06K 9/00463 |
| | | | | 382/189 |
| 2012/0030234 | A1 * | 2/2012 | Ramachandrula | G06F 16/5846 |
| | | | | 707/769 |
| 2014/0363074 | A1 * | 12/2014 | Dolfing | G06K 9/6821 |
| | | | | 382/156 |
| 2015/0269431 | A1 * | 9/2015 | Haji | G06K 9/00879 |
| | | | | 382/186 |
| 2018/0032495 | A1 * | 2/2018 | Matsuda | G06K 9/00416 |
| 2018/0068194 | A1 * | 3/2018 | Matsuda | G06K 9/00436 |
| 2020/0184287 | A1 * | 6/2020 | Meena | G06K 9/6256 |

OTHER PUBLICATIONS

Shilman, Michael, Desney S. Tan, and Patrice Simard. "CueTIP: A mixed-initiative interface for correcting handwriting errors." Proceedings of the 19th annual ACM symposium on User interface software and technology. 2006. (Year: 2006).*

* cited by examiner

FIG. 5

Form of Current State for Children's Allowance/Special Benefit in Fiscal YYYY  —  Filing date: / /

| Recipient | Name *Write name and affix seal | Taro Fuji | | | Seal | | Birth date / / |
|---|---|---|---|---|---|---|---|
| | Address Telephone number | 1-1-1 ZZ-cho., YY-City, XX Pref. | | | | | |
| | | 123-456-789 | | | | | |
| | ...Address | ☐ In the city  ☐ Out of the city  ☐ Overseas | | | | Marital status and the name of your spouse | Married/ Unmarried |
| | Relationship | ☐ Parents ☐ Guardian for underage children ☐ Others | | | | Occupation of your spouse | ☐ None ☐ Office worker ☐ Public servant ☐ Others |

| Supported children under 18 | | Name | Relationship | Birth date | Live together/separately | Address |
|---|---|---|---|---|---|---|
| | 1 | Minato Fuji | Child | 6/26/2010 | Together/Separately | ☑ In the city ☐ Out of the city |
| | 2 | Mirai Fuji | Child | 12/12/2013 | Together/Separately | ☑ In the city ☐ Out of the city |
| | 3 | ... | ... | ... | Together/Separately | ☑ In the city ☐ Out of the city |
| | 4 | ... | ... | ... | Together/Separately | ☑ In the city ☐ Out of the city |
| | 5 | | | | Together/Separately | ☐ In the city ☐ Out of the city |

Pension qualification and office address of the recipient

☐ Welfare pension
☐ Mutual pension
☐ National pension

Labels: 33, 34, 36, 38, 40, 42, 44, 46, 48, 50, 52, 54, 56, 58

| | Scan image / recognition result | Check |
|---|---|---|
| Item name | | |
| Name of Child 1 | Minato Fuji | ☑ |
| Address of Child 1 | Minato Fuji | ☑ |
| | ✓ | |
| Birth date of Child 1 | ☑ 6/26/2010 | |

Form of Current State for Children's Allowance / Special Benefit in Fiscal YYYY   Filing date: / /

| Recipient | Name *Write name and affix seal | Taro Fuji | | Seal | | Birth date / / |
|---|---|---|---|---|---|---|
| | Address | 1-1-1 ZZ-cho., YY-City, XX Pref. | | | Marital status and the name of your spouse | Married/Unmarried |
| | Telephone number | 123-456-789 | | | Occupation of your spouse | ☐ None ☐ Office worker ☐ Public servant ☐ Others |
| | ...Address | ☐ In the city ☐ Out of the city ☐ Overseas | | | | |
| | Relationship | ☐ Parents ☐ Guardian for underage children ☐ Others | | | | |

| Supported children under 18 | | Name | Relationship | Birth date | Live together/separately | Address |
|---|---|---|---|---|---|---|
| | 1 | Minato Fuji | Child | 6/26/2010 | Together/Separately | ☑ In the city ☐ Out of the city |
| | 2 | Mirai Fuji | Child | 12/12/2013 | Together/Separately | ☑ In the city ☐ Out of the city |
| | 3 | ... | ... | ... | Together/Separately | ☑ In the city ☐ Out of the city |
| | 4 | ... | ... | ... | Together/Separately | ☑ In the city ☐ Out of the city |
| | 5 | | | | Together/Separately | ☐ In the city ☐ Out of the city |

Pension qualification and office address of the recipient
☐ Welfare pension
☐ Mutual pension
☐ National pension Page: 1/1  ◁ ▷

Cancel    Apply

FIG. 10

| Writer name | Form name | writing result | |
|---|---|---|---|
| Taro Fuji | Form 1 | 90% | 90 |
| Taro Fuji | Form 2 | 85% | 92 |
| Hanako Fuji | Form 3 | 50% | 94 |

Similar images

Select images that are to be subjected to the same correction.

OK  Cancel

FIG. 11

| Writer name | Form name | writing result |
|---|---|---|
| Taro Fuji | Form 1 | 90% |
| Taro Fuji | Form 2 | 85% |
| Taro Fuji | Written contract 1 | 50% |

Similar images

Select images that are to be subjected to the same correction.

OK  Cancel

FIG. 12

| Item name | Scan image / recognition result | Check |
|---|---|---|
| Name of Child 1 | Minato Fuji | ☑ |
| Address of Child 1 | Minato Fuji | |
| | ✓ ③ | ☑ |
| Birth date of Child 1 | 6/26/2010 □ | ☑ |

Form of Current State for Children's Allowance / Special Benefit in Fiscal YYYY   Filing date: / /

Recipient:
- Name *Write name and affix seal: Taro Fuji    Seal    Birth date: / /
- Address: 1-1-1 ZZ-cho., YY-City, XX Pref.    Marital status and the name of your spouse: ☐ Married/Unmarried
- Telephone number: 123-456-789    Occupation of your spouse: ☐ None ☐ Office worker ☐ Public servant ☐ Others
- ...Address: ☐ In the city ☐ Out of the city ☐ Overseas
- Relationship: ☐ Parents ☐ Guardian for underage children ☐ Others Supported children under 18:

| | Name | Relationship | Birth date | Live together/separately | Address |
|---|---|---|---|---|---|
| 1 | Minato Fuji | Child | 6/26/2010 | Together/Separately | ☑ In the city ☐ Out of the city |
| 2 | Mirai Fuji | Child | 12/12/2013 | Together/Separately | ☑ In the city ☐ Out of the city |
| 3 | ... | ... | ... | Together/Separately | ☑ In the city ☐ Out of the city |
| 4 | ... | ... | ... | Together/Separately | ☐ In the city ☐ Out of the city |
| 5 | | | | Together/Separately | ☐ In the city ☐ Out of the city |

Pension qualification and office address of the recipient
☐ Welfare pension
☐ Mutual pension
☐ National pension Page: 1/1    ☑ ☑

Apply    Cancel

FIG. 13

Maximum extraction area (1 to 2000) (px)

Width: 240  Height: 60

Apply   Finish

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-172599 filed Sep. 14, 2018.

BACKGROUND

(i) Technical Field

The present disclosure relates to an information processing apparatus and a non-transitory computer readable medium.

(ii) Related Art

Recognition processing may be performed on information about characters, symbols, figures, and the like which are handwritten, and an operator may correct the recognition results. For example, an operator may correct the recognition result of characters, the recognition result of a symbol which is written in a checkbox, or the like.

Japanese Unexamined Patent Application Publication No. 6-36066 describes an apparatus modifying characters, which are included in a character recognition result, for each identical character category at a time.

Japanese Unexamined Patent Application Publication No. 2015-49653 describes a method of controlling whether or not an area including not only a handwritten field but also its surrounded area is to be displayed, on the basis of a value indicating a probability in which a character recognition result obtained in character recognition processing is correct.

If an operator finds all of the targets for correction in order to correct recognition results of characters, symbols, figures, and the like, time and effort of the operator increase.

SUMMARY

Aspects of non-limiting embodiments of the present disclosure relate to reduce time and effort of an operator compared with the case in which an operator finds all of the correction targets in recognition results of information written in fill-in areas.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a receiving unit and a controller. The receiving unit receives an extraction-area image indicating an extraction area. The extraction area includes a fill-in area in which a writer handwrites information. When an instruction to correct a recognition result for the information written in the fill-in area indicated by the extraction-area image is given, the controller causes a display unit to display a different extraction-area image similar to the extraction-area image.

BRIEF DESCRIPTION OF THE DRAWINGS

Exemplary embodiment of the present disclosure will be described in detail based on the following figures, wherein:

FIG. 5 is a diagram illustrating a form;

FIG. 7 is a diagram illustrating exemplary display of recognition results;

FIG. 8 is a diagram illustrating exemplary display of recognition results;

FIG. 10 is a diagram illustrating similar images;

FIG. 11 is a diagram illustrating similar images;

FIG. 12 is a diagram illustrating exemplary display of recognition results; and

FIG. 13 is a diagram illustrating an extraction-area setting screen.

DETAILED DESCRIPTION

Figure 1:
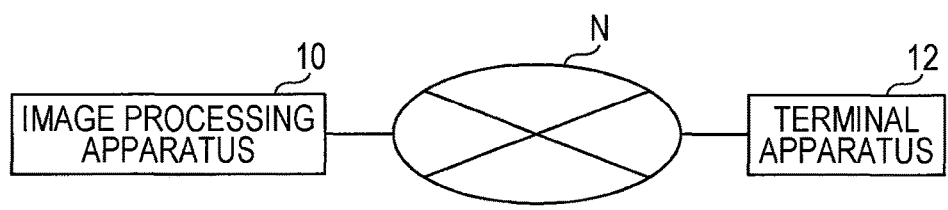
FIG. 1 is a diagram illustrating an information processing system according to an exemplary embodiment.

Referring to FIG. 1, an information processing system according to an exemplary embodiment of the present disclosure will be described. FIG. 1 illustrates an image processing system serving as an exemplary information processing system according to the exemplary embodiment.

The image processing system includes, for example, an image processing apparatus 10 serving as an exemplary information processing apparatus, and one or more terminal apparatuses 12. The image processing apparatus 10 and the terminal apparatuses 12 have a function of communicating with one another through a communication path N, such as the Internet or other networks. An apparatus such as a server may be included in the image processing system.

The image processing apparatus 10 applies recognition processing (character recognition processing and figure recognition processing) to image data so as to recognize, for example, characters, symbols, and figures in the image data. As the recognition processing, for example, an optical character recognition (OCR) process or an optical mark recognition (OMR) process is performed.

Image data to be recognized is not particularly limiting. For example, an image reading apparatus (for example, a scanner) may perform an image reading process on a document, and the image data generated in the image reading process may be used as image data that is to be recognized. Alternatively, image data obtained by an imaging apparatus (for example, a camera) capturing an image of a document may be used as image data that is to be recognized. As a matter of course, image data generated by a method other than these may be used as image data that is to be recognized.

Each terminal apparatus 12 is, for example, a personal computer (PC), a tablet PC, a smartphone, or a cellular phone. For example, information indicating the recognition result of image data is transmitted from the image processing apparatus 10 to a terminal apparatus 12, and the recognition result is displayed on the terminal apparatus 12.

Figure 2:
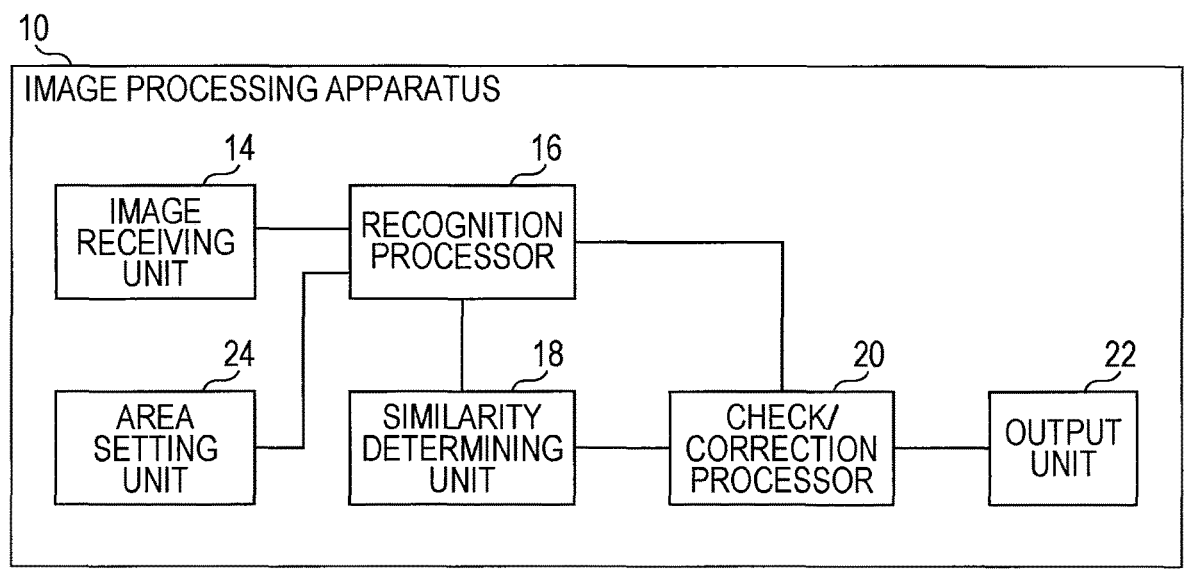
FIG. 2 is a diagram illustrating an image processing apparatus according to the exemplary embodiment.

Referring to FIG. 2, the image processing apparatus 10 will be described in detail below. FIG. 2 illustrates the configuration of the image processing apparatus 10.

An image receiving unit 14 receives image data and outputs the image data to a recognition processor 16. The image receiving unit 14 may receive image data, which is transmitted from an external apparatus, for example, through the communication path N, or may receive image data that is output from an image reading apparatus or an imaging apparatus. An image reading apparatus or an imaging apparatus may be included in the image processing apparatus 10.

The recognition processor 16 applies recognition processing (character recognition processing and figure recognition processing) to image data received by the image receiving unit 14. Thus, the recognition processor 16 recognizes information about characters, symbols, figures, and the like in the image data. For example, the recognition processor 16 specifies a fill-in area (for example, a fill-in field in which characters are written, or a checkbox), in which it is assumed that information (such as characters, a symbol, or a figure) is written, in image data, and recognizes written information (such as characters, a symbol, or a figure) in the fill-in area. The recognition processor 16 may recognize a predetermined area as a fill-in area, or may recognize, as a fill-in area, an area having a predetermined shape and size. For example, a writer handwrites characters, a symbol, a figure, and the like in a fill-in area, and the recognition processor 16 recognizes the characters, the symbol, the figure, and the like handwritten in the fill-in area.

The recognition processor 16 extracts image data (hereinafter referred to as "extraction-area image data"), which describes the extraction area including a fill-in area, from image data that is a recognition target. The recognition processor 16 associates the fill-in area with the extraction-area image data describing the extraction area including the fill-in area. An extraction area is, for example, a predetermined area. A user (for example, a person who inputs image data to the image processing apparatus 10, or an operator such as a corrector who checks and corrects a recognition result) may define an extraction area. The recognition processor 16 recognizes written information in each fill-in area, and extracts extraction-area image data for the fill-in area. The recognition processor 16 outputs information, indicating each recognition result, to a check/correction processor 20, and outputs each piece of extraction-area image data to a similarity determining unit 18.

The similarity determining unit 18 calculates the similarities between pieces of extraction-area image data extracted by the recognition processor 16. In similarity calculation, for example, a known technique is used. For example, similarity is calculated, for example, through feature-value matching between images, matching using templates, or histogram comparison between images. As a matter of course, similarity may be calculated by using a method other than these.

The check/correction processor 20 corrects recognition results obtained by the recognition processor 16. For example, when the check/correction processor 20 receives an instruction for correction from a corrector, the check/correction processor 20 corrects recognition results in accordance with the instruction for correction. The instruction for correction is given, for example, by using a terminal apparatus 12. For example, the check/correction processor 20 displays the image data of a recognition target and its recognition results. For example, the image data of a recognition target and its recognition results are displayed on a terminal apparatus 12.

The check/correction processor 20 specifies extraction-area image data associated with the fill-in area from which the recognition result of a correction target is obtained, and displays, for correction, extraction-area image data similar to the specified extraction-area image data. For example, the check/correction processor 20 specifies, as similar-image data, extraction-area image data whose similarity with the specified extraction-area image data is equal to or greater than a threshold, and displays the similar-image data. The threshold for the similarity is, for example, a predetermined value, and may be changed, for example, by a corrector. The similar-image data is displayed, for example, on a terminal apparatus 12. The check/correction processor 20 corresponds to an exemplary receiving unit and an exemplary controller.

The check/correction processor 20 may correct the recognition results for the fill-in areas included in the extraction areas indicated by the similar-image data, in accordance with the correction of the recognition result of a correction target. That is, the check/correction processor 20 may correct the recognition results for the fill-in areas included in the extraction areas indicated by the similar-image data, similarly to the correction of the recognition result of a correction target. When a corrector gives an instruction to correct the recognition result of a correction target, the check/correction processor 20 may correct the recognition results for the fill-in areas included in the extraction areas indicated by the similar-image data similarly (bulk correction). Alternatively, when a corrector gives the instruction for correction, the check/correction processor 20 may display the similar-image data. After that, in the case where the corrector selects pieces of similar-image data that are to be corrected, and where the corrector gives an instruction to correct the selected pieces in accordance with the correction, the check/correction processor 20 may similarly correct the recognition results of the fill-in areas included in the extraction areas indicated by the pieces of similar-image data selected by the corrector (selective correction).

An output unit 22 outputs information indicating the recognition results having been subjected to the processing performed by the check/correction processor 20. The output unit 22 outputs, for example, information indicating corrected recognition results and information indicating recognition results which have been checked without correction. For example, these types of information may be displayed on a terminal apparatus 12, or may be stored in a terminal apparatus 12, a server, or the like.

An area setting unit 24 sets extraction areas. The recognition processor 16 extracts extraction-area image data in accordance with the settings which are set by the area setting unit 24. The area setting unit 24 may change the size of an extraction area in accordance with the type of a fill-in area (for example, a character fill-in frame or a checkbox). For example, the area setting unit 24 sets, as an extraction area, an area which includes a fill-in area and which is larger than the fill-in area. The ratio of the size of an extraction area with respect to the size of a fill-in area may be predetermined, or may be set by a corrector or the like. The ratio may be changed by a corrector or the like. The area setting unit 24 may set, as an extraction area, an area smaller than a fill-in area. As a matter of course, a corrector or the like may set the size of an extraction area to any size. For example, for a character fill-in frame, a smaller area than the fill-in frame may be set as an extraction area.

Figure 3:
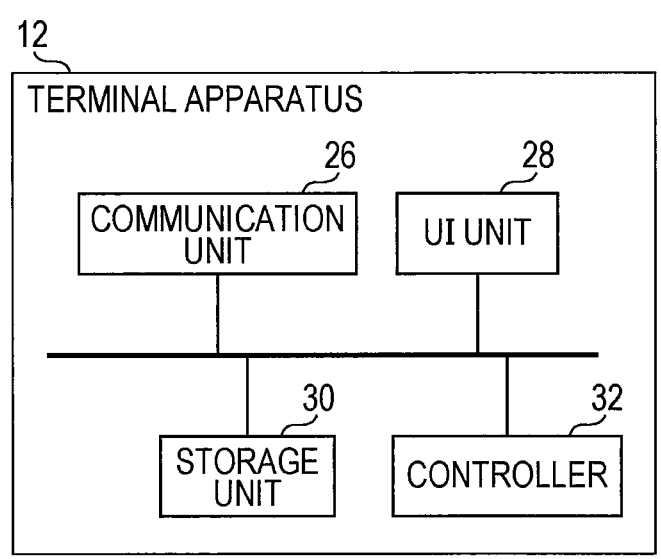
FIG. 3 is a diagram illustrating a terminal apparatus.

Referring to FIG. 3, a terminal apparatus 12 will be described in detail below. FIG. 3 illustrates the configuration of a terminal apparatus 12.

A communication unit 26 which is a communication interface has a function of transmitting information to other apparatuses and a function of receiving information transmitted from other apparatuses. The communication unit 26 may have a wireless communication function, or may have a wired communication function.

A user interface (UI) unit 28 which is a user interface includes a display unit and an operation unit. The display unit is a display apparatus, such as a liquid crystal display or an electroluminescence (EL) display. The operation unit is an input device such as a keyboard. A user interface serving as a display unit and an operation unit (for example, a touch panel) may be used as the UI unit 28. The UI unit 28 may include an audio generating unit such as a speaker generating sound, and an audio input unit such as a mike receiving sound.

For example, the image data of a recognition target, information indicating the recognition results, the extraction-area image data, and the similar-image data are displayed on the display unit of the UI unit 28. A corrector may operate the UI unit 28 to give an instruction to correct recognition results.

A storage unit 30 indicates one or more storage areas storing various types of information (such as data and programs). The storage unit 30 is formed of one or more storage devices (for example, a hard disk drive and a memory).

A controller 32 controls operations of the units of the terminal apparatus 12. For example, the controller 32 controls communication performed by the communication unit 26, controls display of various types of information on the UI unit 28 (the display unit), and controls reception of information received through the UI unit 28 (the operation unit). Specifically, the controller 32 causes the display unit of the UI unit 28 to display, for example, the image data of a recognition target, information indicating the recognition results, the extraction-area image data, and the similar-image data.

In the example in FIG. 1, the image processing apparatus 10 and the terminal apparatuses 12 are configured separately as hardware. Alternatively, a terminal apparatus 12 may be integrated into the image processing apparatus 10. That is, the image processing apparatus 10 may have the configuration (for example, the UI unit 28) included in a terminal apparatus 12. In this case, for example, the image data of a recognition target, and information indicating the recognition results may be displayed on the display unit provided on the image processing apparatus 10. A corrector may correct recognition results by operating the UI unit provided on the image processing apparatus 10.

Figure 4:
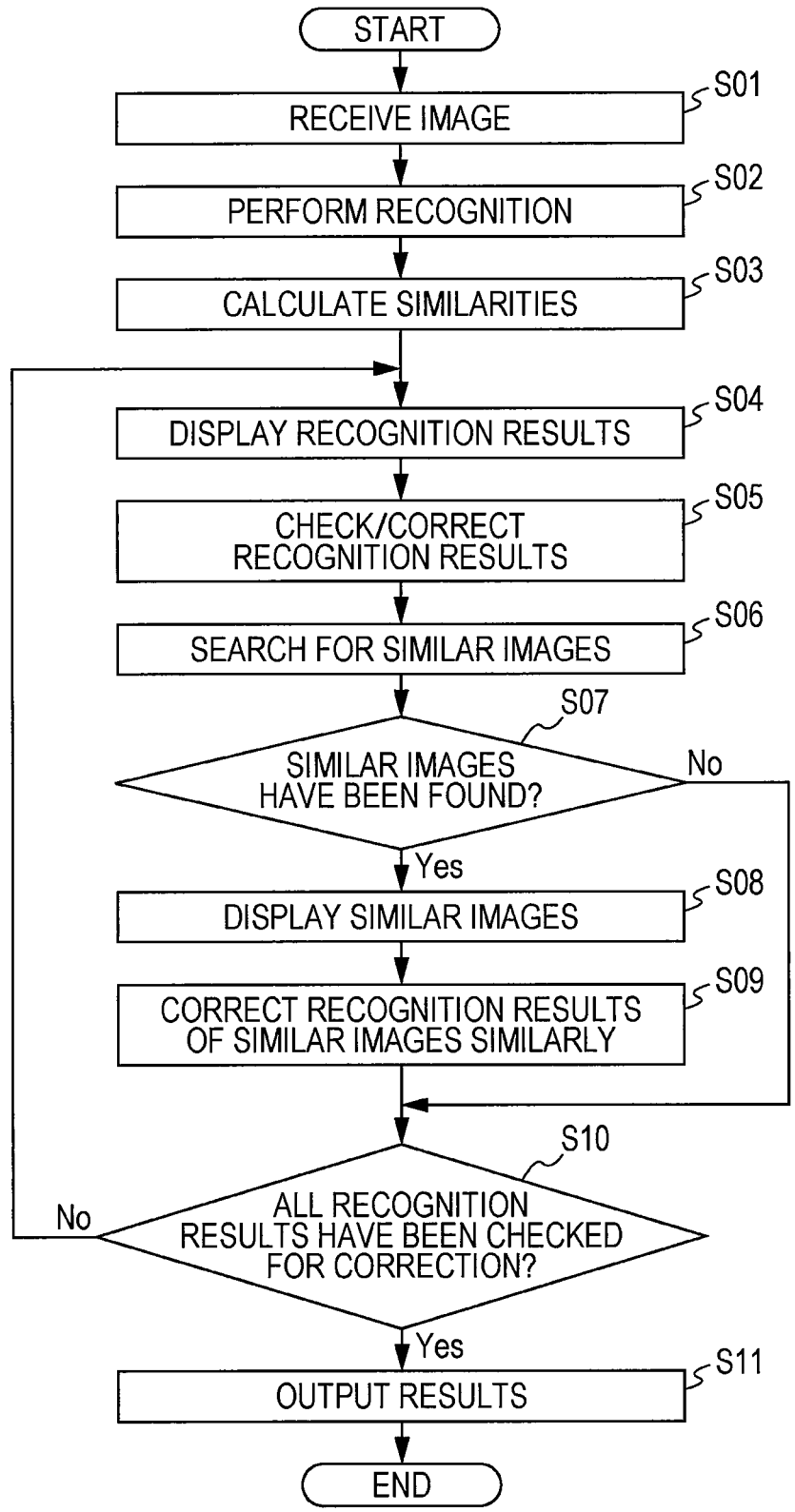
FIG. 4 is a flowchart describing operations performed by an image processing apparatus.

Referring to FIG. 4, operations performed by the image processing apparatus 10 will be described below. FIG. 4 is a flowchart describing the operations.

The image data of a recognition target is input to the image processing apparatus 10, and the image receiving unit 14 receives the image data (step S01).

The recognition processor 16 specifies the fill-in areas in the image data, and recognizes characters, symbols, figures, and the like written in the fill-in areas. The recognition processor 16 further extracts extraction-area image data indicating the extraction area for each fill-in area (step S02).

Then, the similarity determining unit 18 calculates the similarities between pieces of extraction-area image data extracted by the recognition processor 16 (step S03).

The check/correction processor 20, for example, displays the image data of the recognition target and the recognition results (step S04). For example, the image data of the recognition target and information indicating the recognition results are transmitted from the image processing apparatus 10 to a terminal apparatus 12. The controller 32 of the terminal apparatus 12 causes the display unit of the UI unit 28 to display these types of information.

A corrector checks the recognition results displayed on the terminal apparatus 12. When there is a recognition result that is to be corrected, the corrector operates the terminal apparatus 12 to give an instruction for correction. Information indicating the instruction for correction is transmitted from the terminal apparatus 12 to the image processing apparatus 10. The check/correction processor 20 receives the instruction for correction, and corrects the recognition result of the correction target in accordance with the instruction for correction (step S05).

The check/correction processor 20 specifies extraction-area image data associated with the fill-in area for which the recognition result of the correction target is obtained, and searches for similar-image data (similar-image data having a similarity, which is equal to or greater than the threshold, with the extraction-area image data) similar to the extraction-area image data (step S06).

If such similar-image data is found (Yes in step S07), the check/correction processor 20 displays the similar-image data (step S08). For example, the similar-image data is transmitted from the image processing apparatus 10 to the terminal apparatus 12, and the controller 32 of the terminal apparatus 12 causes the display unit of the UI unit 28 to display the similar-image data.

The check/correction processor 20 corrects the recognition results for the fill-in areas included in the extraction areas indicated by the similar-image data, in accordance with the correction having been performed through the instruction from the corrector in step S05 (step S09). That is, the check/correction processor 20 corrects the recognition results for the fill-in areas included in the extraction areas indicated by the similar-image data, similarly to the correction of the recognition result of the correction target. The check/correction processor 20 may correct the recognition results when the corrector gives an instruction for correction, or may correct the recognition results automatically.

If such similar-image data has not been found (No in step S07), the process proceeds to step S10.

If there is a recognition result which has not been checked for correction (No in step S10), the process proceeds to step S04, and the processes after that are performed.

If all of the recognition results have been checked for correction (Yes in step S10), the output unit 22 outputs information indicating the checked recognition results (when corrected, information indicating the corrected recognition results) (step S11). For example, these types of information may be stored or displayed in/on the terminal apparatus 12, or may be stored in an external apparatus such as a server.

The operations performed by the image processing apparatus 10 will be described in more detail by taking specific examples. Hereinafter, "image data" is referred to as an "image"; "extraction-area image data" is referred to as an "extraction-area image"; and "similar-image data" is referred to as a "similar image".

Referring to FIG. 5, the image of a recognition target will be described. For example, assume that an image indicating a document (document image) is used as the image of a recognition target. Specifically, a document image indicating a form is used as the image of a recognition target. FIG. 5 illustrates an exemplary form. A form 33 is a document for execution of a certain procedure.

In the form 33, fill-in fields in which a writer has handwritten information (such as characters, symbols, and figures) are formed (for example, printed). For example, a name fill-in field 34, in which the name of Child 1 is written, a relationship fill-in field 36, in which the relationship with Child 1 is written, a birth-date fill-in field 38, in which the birth date of Child 1 is written, and a checkbox 40, in which a figure (for example, a checkmark) about the address is written, are formed in the form 33 in advance. For Child 2, a name fill-in field 42, a relationship fill-in field 44, a birth-date fill-in field 46, and a checkbox 48 are similarly formed in the form 33 in advance. The same is true for Children 3, 4, so on. These fill-in fields and checkboxes correspond to exemplary fill-in areas.

In the example in FIG. 5, for Children 1 to 4, a writer has handwritten characters indicating the names of the children, characters indicating the relationships, and characters indicating the birth dates in the name fill-in fields, the relationship fill-in fields, and the birth-date fill-in fields, respectively.

For Child 1, a checkmark 54 has been written so as to extend out of the checkbox 40. That is, a portion of the checkmark 54 is written inside the checkbox 40, and the other portion is written outside the checkbox 40. The same is true for a checkmark 56 written in the checkbox 48 for Child 2, and a checkmark 58 written in a checkbox 52 for Child 4. The checkbox 50 for Child 3 has not been checked.

For example, the form is read by using an image reading apparatus (for example, a scanner). Thus, the image indicating the form 33 (hereinafter referred to as the "form image") is generated. The form may be imaged by using an imaging apparatus (for example, a camera). Thus, a form image may be generated.

The form image which is input to the image processing apparatus 10 is received by the image receiving unit 14 so that recognition processing is performed.

For example, the recognition processor 16 applies character recognition processing to the fill-in fields indicated by the form image, thus recognizing the characters in the fill-in fields. The recognition processor 16 applies figure recognition processing to the checkboxes, thus recognizing the figures (checkmarks) written in the checkboxes. For example, fill-in fields such as name fill-in fields and checkboxes are specified by a person who inputs an image, a corrector, or the like in advance as fill-in areas that are to be recognized. The recognition processor 16 performs recognition processing on the input fields and the checkboxes which are thus specified.

As a matter of course, the recognition processor 16 may recognize characters, figures, and the like by using a known recognition technique other than the above-described recognition technique. For example, the recognition processor 16 recognizes a rectangular area (such as a rectangular or square area surrounded by a straight-line frame border) in the form image, as a fill-in field or a checkbox. The recognition processor 16 recognizes characters or a figure written in the fill-in field or the checkbox. For example, the name fill-in field 34, the checkbox 40, and the like have a rectangular area. The recognition processor 16 recognizes the characters written in the name fill-in field 34, and recognizes a checkmark written in the checkbox 40. The same is true for other name fill-in fields, checkboxes, and the like. As a matter of course, the recognition processor 16 may recognize an area having a shape other than a rectangle (for example, an area having a circular shape or an elliptic shape, or an area surrounded by parentheses) as a fill-in area. Then, the recognition processor 16 may recognize characters, a figure, and the like written in the area. In addition, the position (coordinates) of each of the fill-in fields and the checkboxes in the form image may be predetermined. In this case, the recognition processor 16 specifies the position of each of the fill-in fields and the checkboxes in the form image on the basis of the coordinates of the fill-in field or checkbox, and recognizes characters, a figure, and the like written in the fill-in field or checkbox.

From the form image, the recognition processor 16 extracts, for each fill-in field, an extraction-area image indicating the extraction area including the fill-in field, and extracts, for each checkbox, an extraction-area image indicating the extraction area including the checkbox.

Figure 6:
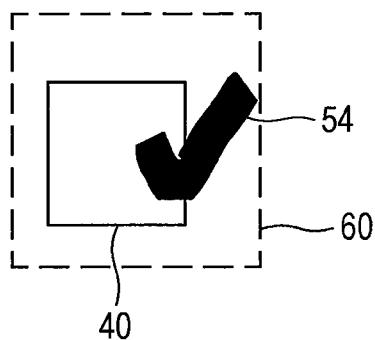
FIG. 6 is a diagram illustrating an extraction area.

Referring to FIG. 6, the extraction area for the checkbox 40 will be described. FIG. 6 illustrates an exemplary extraction area. An extraction area 60 is an area that is set for the checkbox 40, and includes the checkbox 40 and its surrounding area. For example, an area larger than the checkbox 40 by about several to several tens percent is set as the extraction area 60. The extraction area 60 may be an area having a shape similar to that of the checkbox 40, or may be an area having a shape different from that of the checkbox 40. The size and shape of the extraction area 60 may be predetermined or may be defined by a corrector or the like. For example, when it is assumed that characters, figures, and the like may be written so as to extend out of a fill-in area, an extraction area is set so as to include an area in which the characters, the figures, and the like may be written outside the fill-in area.

When the extraction area 60 is set as an extraction area for the checkbox 40, the recognition processor 16 extracts the image indicating the extraction area 60 from the form image as an extraction-area image. In the example in FIG. 6, the checkbox 40 and the checkmark 54 are illustrated in the extraction area 60. Thus, the recognition processor 16 extracts the extraction-area image indicating the checkbox 40 and the checkmark 54 from the form image.

For the name fill-in field 34, the relationship fill-in field 36, and the like, the recognition processor 16 extracts extraction-area images from the form image similarly to the extraction area 60.

The similarity determining unit 18 calculates the similarities between the extraction-area images extracted by the recognition processor 16. For example, the similarity determining unit 18 calculates the similarities between the extraction-area image indicating the checkbox 40 and the checkmark 54, and other extraction-area images (for example, the extraction-area image, which indicates the checkbox 48 and the checkmark 56, and the extraction-area images for the name fill-in fields). The same is true for extraction-area images for other checkboxes, name fill-in fields, relationship fill-in fields, and birth-date fill-in fields.

Figure 7:
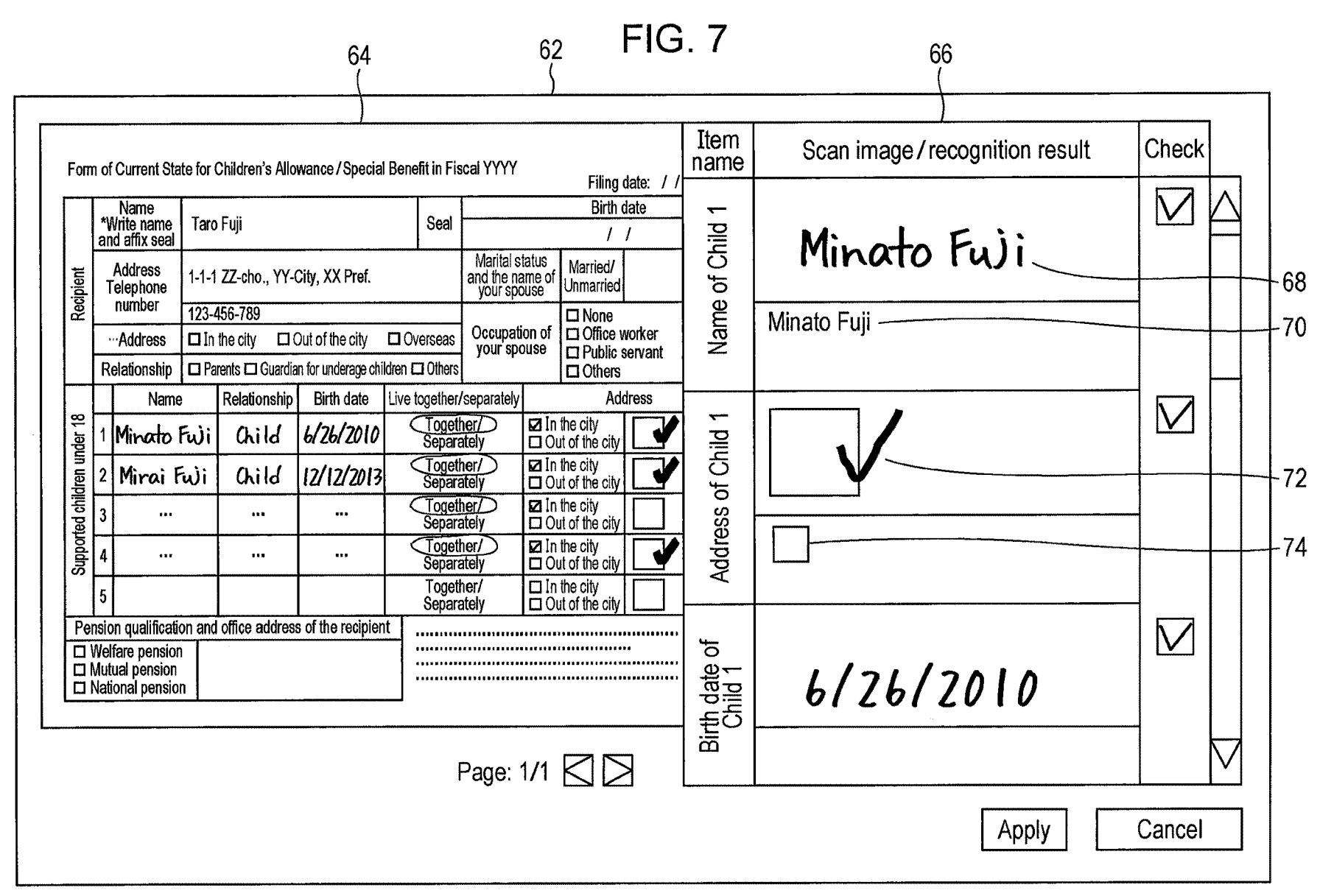

Recognition processing is performed as described above. Then, the recognition results are displayed on a terminal apparatus 12. Referring to FIG. 7, exemplary display of recognition results will be described below. FIG. 7 illustrates an exemplary screen in which recognition results are displayed.

Recognition results are displayed on a screen 62. For example, information about the screen 62 is transmitted from the image processing apparatus 10 to a terminal apparatus 12, and the screen 62 is displayed on the UI unit 28 of the terminal apparatus 12.

In the example in FIG. 7, a form image 64 indicating the form 33 and a display field 66 for recognition results are displayed in the screen 62. In the display field 66, pairs of an image in the form image 64, which has been subjected to recognition processing, (for example, a scan image generated through scanning) and information indicating the result of the recognition processing on the image are displayed.

An image 68 indicates the name fill-in field 34, and illustrates the characters themselves handwritten in the name fill-in field 34. As the image 68, the extraction-area image indicating the name fill-in field 34 and its surrounding area may be displayed. A recognition result 70 is a recognition result obtained through character recognition processing on the name fill-in field 34. In this example, a string (for example, a string, "Minato Fuji") is displayed as the recognition result 70.

An image 72 is an image indicating the checkbox 40 and its surrounding area, and is an image indicating a checkmark itself handwritten in the checkbox 40 and its surrounding area. In this example, a checkmark itself handwritten so as to extend out of the checkbox 40 is displayed. As the image 72, an extraction-area image indicating the checkbox 40 and its surrounding area (an image indicating the extraction area 60 in FIG. 6) may be displayed. A recognition result 74 is a recognition result obtained through figure recognition processing on the checkbox 40. In this example, a checkmark is written so as to extend out of the checkbox 40. The ratio of the area of a portion of the checkmark written inside the checkbox 40 does not reach the ratio of the area that is large enough to recognize, as a checkmark, a figure written in the checkbox 40. Therefore, it is recognized that no checkmarks are written in the checkbox 40 (it is recognized that the check is off), and a blank checkbox is displayed as the recognition result 74.

Similarly, for other fill-in fields, checkboxes, and the like, the images and their recognition results are displayed.

As described above, regardless of a checkmark which has been actually written in the checkbox 40, it may be recognized that a checkmark is not written depending on the position at which the checkmark is written. For example, due to peculiarities in a writer's writing, it may be recognized that a checkmark is not written.

When a fold line is formed on the form 33, the fold line may be erroneously recognized as a line. For example, when a fold line is formed so as to extend through a checkbox, regardless of the checkbox in which a checkmark is not written, the fold line may be recognized as a checkmark, and it may be erroneously recognized that a checkmark is written in the checkbox. The same is true, for example, for a fill-in field for inputting characters. Thus, due to peculiarities of a writer or the state of the form 33 (for example, a fold line or attachment of dust), characters, symbols, figures, and the like may be erroneously recognized.

A corrector may operate the UI unit 28 of the terminal apparatus 12 to correct recognition results on the screen 62. For example, the corrector may correct a string serving as a recognition result, or may add a checkmark to a blank checkbox which is a recognition result. In addition, the corrector may delete a checkmark from a checkbox for which the checkmark is recognized. When the corrector gives an instruction for correction, information indicating the instruction for correction is transmitted from the terminal apparatus 12 to the image processing apparatus 10. The check/correction processor 20 corrects the recognition results in accordance with the instruction for correction.

For example, when a corrector adds a checkmark to the blank checkbox displayed as the recognition result 74 on the screen 62, the check/correction processor 20 corrects the recognition result, which describes whether or not a checkmark is present for the checkbox 40, from "no checkmark" (the check is off) to "check-marked" (the check is on). FIG. 8 illustrates the result of the correction. The corrector adds a checkmark to the checkbox displayed as the recognition result 74. Thus, the check/correction processor 20 corrects the recognition result, which describes whether or not a checkmark is present for the checkbox 40, from "no checkmark" to "check-marked".

The check/correction processor 20 searches for images similar to the extraction-area image (the image indicating the extraction area 60 in FIG. 6) associated with the checkbox 40 for which the recognition result 74 which is a correction target has been obtained. The check/correction processor 20 corrects the recognition results for the fill-in areas (for example, checkboxes) included in the extraction areas indicated by the similar images, in a similar way to the correction for the recognition result 74 which is a correction target (bulk correction). That is, when an instruction to correct the recognition result 74 which is a correction target is given, the recognition results for the fill-in areas associated with similar images are corrected at a time.

For example, assume that the extraction-area image associated with the checkbox 48 (the image indicating the checkbox 48 and its surrounding area) and the extraction-area image associated with the checkbox 52 (the image indicating the checkbox 52 and its surrounding area) are similar to the extraction-area image associated with the checkbox 40. That is, the similarity between the extraction-area image associated with the checkbox 48 and the extraction-area image associated with the checkbox 40 is equal to or greater than the threshold, and the similarity between the extraction-area image associated with the checkbox 52 and the extraction-area image associated with the checkbox 40 is equal to or greater than the threshold. The extraction-area image associated with the checkbox 48 indicates the checkbox 48 and the checkmark 56 having a portion written outside the checkbox 48. The extraction-area image associated with the checkbox 52 indicates the checkbox 52 and the checkmark 58 having a portion written outside the checkbox 52.

In this case, the check/correction processor 20 corrects the recognition results, which describe whether or not corresponding checkmarks are present for the checkboxes 48 and 52, similarly to the correction for the checkbox 40 which is a correction target (bulk correction). For example, when no checkmarks are recognized for the checkboxes 48 and 52 (when the check is off), the check/correction processor 20 corrects the recognition results, which describe whether or not corresponding checkmarks are present for the checkboxes 48 and 52, from "no checkmark" to "check-marked" (bulk correction).

For example, when a corrector corrects the recognition result for the checkbox 40, the check/correction processor 20 may correct the recognition results for the checkboxes 48 and 52 in response to the instruction for correction. Alternatively, when, in addition to an instruction to correct the recognition result for the checkbox 40, a corrector gives an instruction to correct the recognition results for the checkboxes 48 and 52 in accordance with the correction for the checkbox 40, the check/correction processor 20 may correct the recognition results for the checkboxes 48 and 52.

The check/correction processor 20 may change the display of the form image 64 in accordance with the correction results. For example, the check/correction processor 20 displays, in an emphasized manner, a written image indicating characters, a figure, and the like which are written in a fill-in area for which correction has been performed in the form image 64 (for example, highlighted display, or display with a color (for example, red) different from that of other parts). In this case, the check/correction processor 20 may display, in an emphasized manner, a written image indicating characters, a figure, and the like written in a fill-in area which is associated with a similar image and for which the recognition result has been corrected in accordance with the correction. For example, the same correction as that for the checkbox 40 has been performed on the checkboxes 48 and 52. Therefore, in the example in FIG. 8, the check/correction processor 20 displays, in an emphasized manner, a checkmark image 76 indicating the checkmark 56 and a checkmark image 78 indicating the checkmark 58. The checkmark images 76 and 78 are exemplary written images. For example, the check/correction processor 20 calculates the difference between a form image, which is obtained before characters, a figure, and the like are written, and a form image obtained after the writing is performed. Thus, the check/correction processor 20 extracts the written characters, figures, and the like. Then, the check/correction processor 20 displays, in an emphasized manner, the written image indicating the corrected characters and the like. The check/correction processor 20 may display, in an emphasized manner, the checkmark image indicating the corrected checkmark 54.

As described above, when a corrector corrects the recognition result of a correction target, the recognition results for the fill-in areas associated with similar images are also corrected similarly. Therefore, compared with the case in which a corrector manually searches for similar images, time and effort of the corrector are reduced.

The check/correction processor 20 may display similar images. For example, when a corrector gives an instruction to correct a recognition result on the screen 62, the check/correction processor 20 searches for images similar to the extraction-area image associated with the fill-in area from which the corrected recognition result is obtained, and displays the similar images.

A specific example will be described. When a corrector adds a checkmark to the blank checkbox displayed as the recognition result 74 on the screen 62, the check/correction processor 20 displays images similar to the extraction-area image (the image indicating the extraction area 60 in FIG. 6) associated with the checkbox 40.

Figure 9:
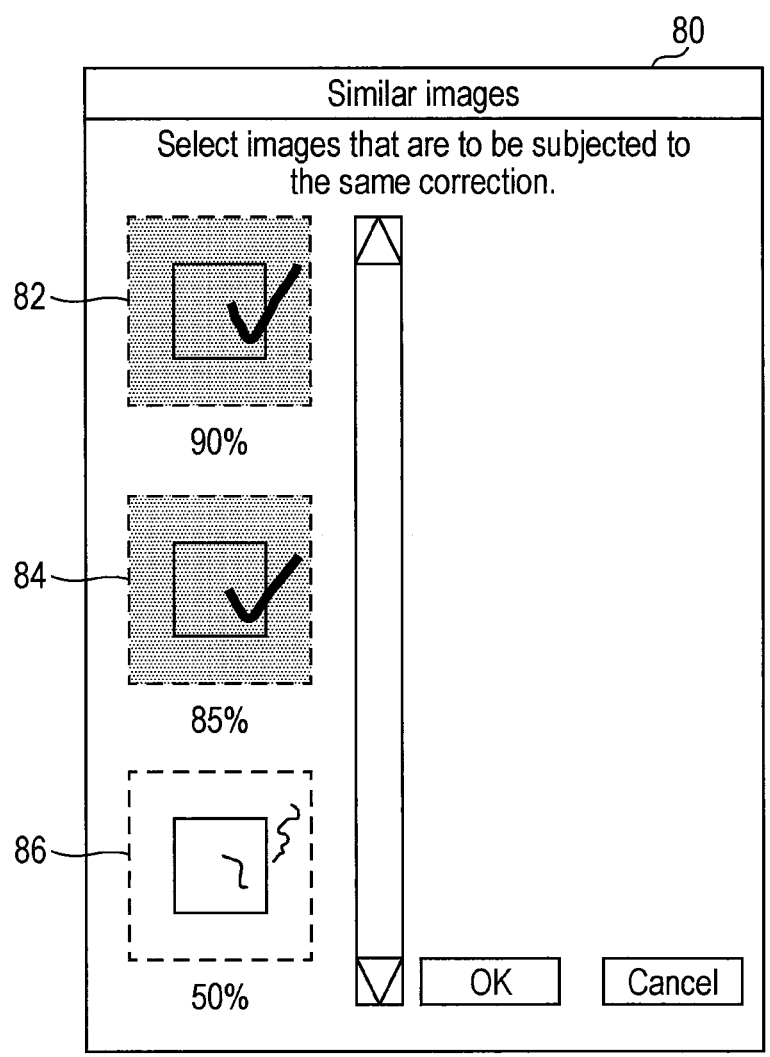
FIG. 9 is a diagram illustrating similar images.

Referring to FIG. 9, exemplary display of similar images will be described. FIG. 9 illustrates an exemplary display area (display window) of similar images. In a display window 80, images similar to the extraction-area image associated with the checkbox 40 are displayed. Information about the display window 80 is transmitted from the image processing apparatus 10 to the terminal apparatus 12, and the display window 80 is displayed on the UI unit 28 of the terminal apparatus 12. In a state in which the screen 62 is displayed on the UI unit 28, the display window 80 may be displayed as a pop-up window. For example, when a corrector adds a checkmark to the blank checkbox displayed as the recognition result 74 on the screen 62 (that is, when an instruction to correct the recognition result 74 is given), the check/correction processor 20 causes the UI unit 28 to display the display window 80. Information indicating the similarities with the extraction-area image associated with the checkbox 40 is displayed in association with the respective similar images.

For example, extraction-area images 82, 84, and 86 are displayed as similar images in the display window 80. The similarities between the extraction-area image associated with the checkbox 40 and the extraction-area images 82, 84, and 86 are 90%, 85%, and 50%, respectively. An image having a higher similarity indicates an image which is more similar to the extraction-area image associated with the checkbox 40. The check/correction processor 20 may display the extraction-area images in order of similarity. In the example in FIG. 9, an extraction-area image having a higher similarity is displayed at an upper position.

Assume that, for example, the extraction-area image 82 is an image indicating the checkbox 48 and its surrounding area (the checkmark 56); the extraction-area image 84 is an image indicating the checkbox 52 and its surrounding area (the checkmark 58); the extraction-area image 86 is an image indicating the checkbox 50 and its surrounding area. In addition, assume that no checkmarks are recognized for the checkboxes 48, 50, and 52.

A corrector operates a terminal apparatus 12 to select, from the extraction-area images 82, 84, and 86, extraction-area images that are to be corrected in accordance with the correction and give an instruction for correction (for example, the corrector presses the OK button). At that time, the check/correction processor 20 corrects the recognition results for the checkboxes associated with the selected extraction-area images, in accordance with the correction of the recognition result 74 for the checkbox 40. That is, the check/correction processor 20 corrects the recognition results, which describe whether or not checkmarks are present for the checkboxes associated with the selected extraction-area images, from "no checkmark" to "check-marked". For example, when a corrector selects the extraction-area images 82 and 84 as correction targets and gives an instruction for correction, the check/correction processor 20 corrects the recognition result, which describes whether or not a checkmark is present for the checkbox 48 associated with the extraction-area image 82, from "no checkmark" to "check-marked". The same is true for the recognition result for the checkbox 52 associated with the extraction-area image 84.

In the above-described example, the recognition result for a checkbox is corrected. The case of a fill-in field (for example, a name fill-in field or a birth-date fill-in field) in which characters are written is similar to the above-described case. When the recognition result for a certain fill-in field is corrected, similar images are displayed. In addition, the recognition results for the fill-in fields associated with the similar images may be corrected at a time.

As described above, when a corrector gives an instruction to correct a recognition result that is a correction target, similar images are displayed. Therefore, compared with the case in which a corrector manually searches for similar images, time and effort of the corrector are reduced.

In the above-described example, the check/correction processor 20 searches the same document image (form image) for similar images. Alternatively, the check/correction processor 20 may search other document images for similar images. For example, the check/correction processor 20 may search, for similar images, different document images indicating different documents in which the same writer has written characters and the like, or may search, for similar images, document images indicating documents of the same type.

For example, the image receiving unit 14 receives a document image, type information indicating the type of the document indicated by the document image, and writer identification information for identifying a writer who has written characters and the like in the document. The document image, the type information, and the writer identification information are stored in association with one another in a storage device (not illustrated). The storage device may be provided for the image processing apparatus 10, or may be provided for an external apparatus such as a server. Every time the image receiving unit 14 receives a document image, its type information, and its writer identification information, the image receiving unit 14 causes the storage device to store the document image, the type information, and the writer identification information in association with one another. Examples of the document type include a form for executing a certain procedure, a report, a document for round robin approval, a written statement, a minute, and a document for announcement. The writer identification information is, for example, information indicating the name, the identification (ID), and the like of a writer. For example, a writer or a different operator uses a terminal apparatus (not illustrated) to input type information and writer identification information. The image receiving unit 14 receives the type information and the writer identification information. As a matter of course, a document image may be associated with type information and writer identification information in advance. Association between a document image and writer identification information is utilized to specify a document image indicating a document written by the same writer. In addition, association between a document image and type information is utilized to specify a document image indicating a document of the same type. A document image may be associated with both its type information and its writer identification information, or may be associated with one of its type information and its writer identification information.

Referring to FIG. 10, a process of searching, for similar images, document images indicating documents of the same type will be described. FIG. 10 illustrates an exemplary display window for similar images. For example, when a corrector adds a checkmark to the blank checkbox displayed as the recognition result 74 on the screen 62 illustrated in FIG. 7 (that is, when the recognition result 74 is corrected), the check/correction processor 20 causes the UI unit 28 to display a display window 88. In the display window 88, images similar to the extraction-area image associated with the checkbox 40 are displayed. Information about the display window 88 is transmitted from the image processing apparatus 10 to the terminal apparatus 12, and the display window 88 is displayed on the UI unit 28 of the terminal apparatus 12. In the state in which the screen 62 is displayed on the UI unit 28, the display window 88 may be displayed as a pop-up window. Information indicating the similarities with the extraction-area image associated with the checkbox 40 are displayed in association with the respective similar images.

For example, extraction-area images 90, 92, and 94 are displayed as similar images in the display window 88. The similarities between the extraction-area image association with the checkbox 40 and the extraction-area images 90, 92, and 94 are 90%, 85%, and 50%, respectively. An image having a higher similarity indicates an image which is more similar to the extraction-area image associated with the checkbox 40. The check/correction processor 20 may display the extraction-area images in order of similarity. In the example in FIG. 10, an extraction-area image having a higher similarity is displayed at an upper position.

In this example, the check/correction processor 20 searches, for similar images, form images indicating forms of the same type as that of the form 33 (the document indicated by the document image that is a check target). For example, the document "Form 1" is a document in which the writer "Taro Fuji" has written characters and the like, and is a document of the same type of that of the form 33. In this example, the document "Form 1" is the form 33. The extraction-area image 90 is a similar image found in the form image indicating the document "Form 1". The document "Form 2" is a document in which the writer "Taro Fuji"

has written characters and the like, and is a document of the same type of that of the form 33. The document "Form 2" is a document different from the form 33. The extraction-area image 92 is a similar image found in the form image indicating the document "Form 2". The document "Form 3" is a document in which the writer "Hanako Fuji" has written characters and the like, and is a document of the same type of that of the form 33. The document "Form 3" is a document different from the form 33. The extraction-area image 94 is a similar image found in the form image indicating the document "Form 3". In the display window 88, sets of information indicating a writer name, information indicating a form name, and a similar image which are associated with one another are displayed. Each of the extraction-area images 90, 92, and 94 is an image indicating a checkbox and its surrounding area. In addition, assume that no checkmarks are recognized for the checkboxes associated with the extraction-area images 90, 92, and 94.

When a corrector operates the terminal apparatus 12 to select, from the extraction-area images 90, 92, and 94, extraction-area images that are to be corrected in accordance with the correction, and give an instruction for correction (for example, when the corrector presses the OK button), the check/correction processor 20 corrects the recognition results for the checkboxes associated with the selected extraction-area images, in accordance with the correction of the recognition result 74 for the checkbox 40. That is, the check/correction processor 20 corrects the recognition results, which describe whether or not checkmarks are present for the checkboxes associated with the selected extraction-area images, from "no checkmark" to "check-marked". For example, when a corrector selects the extraction-area images 90 and 92 as correction targets and gives an instruction for correction, the check/correction processor 20 corrects the recognition result, which describes whether or not a checkmark is present for the checkbox associated with the extraction-area image 90, from "no checkmark" to "check-marked". The same is true for the recognition result for the checkbox associated with the extraction-area image 92.

As described above, document images indicating documents of the same type as that of the document which is a correction target are searched for similar images, and the similar images are displayed. Thus, compared with the case in which a corrector manually searches for similar images, time and effort of the corrector are reduced. For example, tendencies of erroneous recognition may be similar in documents of the same type. Therefore, similar images found in document images indicating documents of the same type are displayed. Thus, similar images having such tendencies are presented to a corrector.

Referring to FIG. 11, a process of searching, for similar images, document images indicating documents in which the same writer has written characters and the like will be described. FIG. 11 illustrates an exemplary display window for similar images. For example, when a corrector has added a checkmark to the blank checkbox displayed as the recognition result 74 on the screen 62 illustrated in FIG. 7 (that is, the recognition result 74 has been corrected), the check/correction processor 20 causes the UI unit 28 to display a display window 96. In the display window 96, images similar to the extraction-area image associated with the checkbox 40 are displayed. Information about the display window 96 is transmitted from the image processing apparatus 10 to the terminal apparatus 12, and the display window 96 is displayed on the UI unit 28 of the terminal apparatus 12. In the state in which the screen 62 is displayed on the UI unit 28, the display window 96 may be displayed as a pop-up window. Information indicating the similarities with the extraction-area image associated with the checkbox 40 is displayed in association with the respective similar images.

For example, extraction-area images 90, 92, and 98 are displayed as similar images in the display window 96. The similarities between the extraction-area image associated with the checkbox 40 and the extraction-area images 90, 92, and 98 are 90%, 85%, and 50%, respectively. An image having a higher similarity is an image more similar to the extraction-area image associated with the checkbox 40. The check/correction processor 20 may display the extraction-area images in order of similarity. In the example in FIG. 11, an extraction-area image having a higher similarity is displayed at an upper position.

In this example, the check/correction processor 20 searches, for similar images, form images indicating forms in which the writer "Taro Fuji", who has written characters and the like in the form 33 (the document indicated by a document image that is a check target), has written characters and the like. For example, similarly to the example in FIG. 10, the documents, "Form 1" and "Form 2", are documents in which the writer "Taro Fuji" has written characters and the like. The document "Written contract 1" is a document in which the writer "Taro Fuji" has written characters and the like. The document "Written contract 1" is a document of a type different from that of the form 33, but is a document in which "Taro Fuji" who has written characters and the like in the form 33 has written characters and the like. The extraction-area image 98 is a similar image found in the document image (written contract image) indicating the "Written contract 1". In the display window 96, sets of information indicating a writer name, information indicating a form name, and a similar image which are associated with one another are displayed. Similar images may be filtered by using their writer names and their document names. Each of the extraction-area images 90, 92, and 98 is an image indicating a checkbox and its surrounding area. Assume that no checkmarks are recognized from the checkboxes associated with the extraction-area images 90, 92, and 98.

Similarly to the examples in FIGS. 9 and 10, when a corrector selects extraction-area images from the extraction-area images 90, 92, and 98 and gives an instruction for correction, the recognition results for the checkboxes associated with the selected extraction-area images are corrected in accordance with the correction on the recognition result 74 for the checkbox 40.

As described above, document images indicating documents in which the same writer has written characters and the like are searched for similar images, and the similar images are displayed. Thus, compared with the case in which a corrector manually searches for similar images, time and effort of the corrector are reduced. For example, in the case of the same writer, substantially the same erroneous recognition may occur due to peculiarities of the writer in other document images. Therefore, similar images found in document images indicating documents in which the same writer has written characters and the like are displayed. Thus, similar images in which such erroneous recognition may occur are presented to a corrector.

The check/correction processor 20 may search, for similar images, document images indicating documents which are of the same type and in which the same writer has written characters and the like. In this case, in the examples in FIGS. 10 and 11, the check/correction processor 20 searches, for similar images, form images indicating the documents, "Form 1" and "Form 2", in which the writer "Taro Fuji" has written characters and the like. As a result, the extraction-area images 90 and 92 which have been found are displayed in the display window, and the extraction-area images 94 and 98 are not displayed.

A list of the document images stored in the storage device may be displayed on the UI unit 28 of the terminal apparatus 12. A corrector may specify document images that are to be checked. Then, the specified document images may be displayed on the UI unit 28, and the recognition results of the document images may be checked for correction.

The check/correction processor 20 may cause the number of similar images to be displayed on the screen 62. FIG. 12 illustrates exemplary display of the case. For example, when three images similar to the extraction-area image (the image indicating the extraction area 60 in FIG. 6) associated with the checkbox 40 from which the recognition result 74 is obtained are found, a mark 100 indicating the number of similar images is displayed on the screen 62 in association with the extraction-area image. Thus, information indicating that three similar images have been found is presented to a corrector.

The corrector selects the mark 100 on the screen 62 (for example, when the corrector clicks the mark 100), the check/correction processor 20 causes the UI unit 28 to display the display window 80 illustrated in FIG. 9, the display window 88 illustrated in FIG. 10, or the display window 96 illustrated in FIG. 11.

Alternatively, the check/correction processor 20 may search for similar images on the basis of the time when a document image is generated. For example, the check/correction processor 20 searches, for similar images, document images generated in a time predetermined on the basis of the time when a document image which is a check target is generated. The time when a document image is generated is, for example, the time when the document is scanned so that the document image is generated, or the time when the document is imaged. For example, when the form image 64 specified as a document image to be checked is displayed on the screen 62, the check/correction processor 20 searches, for similar images, document images generated in the time predetermined on the basis of the time when the form image 64 is generated. The check/correction processor 20 may search, for similar images, document images generated in the predetermined time before the form image 64 is generated. Alternatively, the check/correction processor 20 may search, for similar images, document images generated in the predetermined time after the form image 64 is generated. Alternatively, the check/correction processor 20 may search, for similar images, document images generated in the predetermined times before and after the form image 64 is generated. The check/correction processor 20 also searches the form image 64 for similar images.

The check/correction processor 20 may search, for similar images, document images which are generated in the time predetermined on the basis of the time when the form image 64 is generated and in which the same person as the writer who has written characters and the like in the form 33 has written characters and the like.

When a corrector gives an instruction to correct a recognition result that is to be corrected, the check/correction processor 20 may correct the fill-in areas associated with the similar images in accordance with the correction and the attribute of the fill-in areas. For example, in the case where the fill-in areas associated with the similar images correspond to fill-in areas in which it is assumed that writing is to be performed in a single-character frame (for example, a single character, a single number, a single symbol, or a single figure), when a corrector gives an instruction to correct the recognition result that is to be corrected, the check/correction processor 20 similarly corrects the recognition results for the fill-in areas associated with the similar images. That is, bulk correction is performed for single-character frames. In contrast, in the case where the fill-in areas associated with the similar images include frames other than a single-character frame, such as name fill-in fields, when a corrector gives an instruction to correct the recognition result that is to be corrected, as illustrated in FIG. 9 and the like, the check/correction processor 20 causes the UI unit 28 to display a display window on which the similar images are displayed. When a corrector gives an instruction to correct the similar images in accordance with the correction, the check/correction processor 20 similarly corrects the recognition results for the fill-in areas associated with the similar images. Attribute information indicating the attribute of a fill-in area may be associated in advance with the display position of the fill-in area in the document image. In addition, the check/correction processor 20 may assume the attribute of a fill-in area associated with a specific string on the basis of the string described in the document image. For example, a string, such as "Your name" or "Name", is a string expressing the attribute "name". Therefore, a fill-in area associated with such a string (for example, a fill-in area disposed near such a string) has the attribute "name". As other attributes, the attribute "address", the attribute "telephone number", the attribute "ID", and the like may be used. In addition, the check/correction processor 20 may assume the attribute of a fill-in area on the basis of the size and shape of the fill-in area. For example, when the size of a fill-in area is suitable for a single character, a single symbol, a single figure, or the like, the fill-in area is recognized as a single-character frame.

The check/correction processor 20 may perform bulk correction on the recognition results for the fill-in areas associated with similar images, on the basis of recognition confidence factors. A confidence factor indicates the degree of confidence in which characters, a symbol, a figure, and the like are correctly recognized through recognition processing (the degree indicating a probability in which a recognition result is correct). For example, the reciprocal of the distance between the feature of characters extracted from a document image and the standard feature of a recognition candidate of the characters is used as the confidence factor. A greater confidence factor means that the feature of extracted characters is closer to the standard feature of a recognition candidate, leading to a decrease in the probability in which the recognition result is erroneous. As another definition, the similarity between the features may be used as the confidence factor. As a matter of course, a different definition other than these may be used.

For example, the check/correction processor 20 performs bulk correction on the recognition results for the fill-in areas associated with similar images whose confidence factors are less than a threshold. Thus, recognition results having high probabilities of being erroneous are corrected at a time. As a matter of course, the check/correction processor 20 may perform bulk correction on the recognition results for the fill-in areas associated with similar images whose confidence factors are equal to or greater than the threshold. The threshold for the confidence factor is, for example, a predetermined value, and may be changed by a corrector or the like.

Referring to FIG. 13, a setting screen for an extraction area will be described. FIG. 13 illustrates an exemplary extraction-area setting screen. In the extraction-area setting screen, the width and height of an extraction area may be set by using a pixel count. As another example, the width and height of an extraction area may be set by using a ratio (%) with respect to the fill-in area. Alternatively, the width and height of an extraction area may be set for each recognition target (such as characters, a symbol, or a figure). In this case, the width and height of an extraction area may be changed for each recognition target. For example, the extraction-area setting screen is displayed on the UI unit 28 of a terminal apparatus 12, and a corrector sets the width and height of an extraction area. The recognition processor 16 extracts an extraction-area image in accordance with the information which has been set in the window.

Each of the image processing apparatus 10 and the terminal apparatuses 12 which are described above is implemented, for example, in cooperation with hardware and software. Specifically, each of the image processing apparatus 10 and the terminal apparatuses 12 includes one or more processors such as a central processing unit (CPU) (not illustrated). The one or more processors read programs stored in a storage device (not illustrated) and execute the programs. Thus, the units of each of the image processing apparatus 10 and the terminal apparatuses 12 are implemented. The programs described above are stored in the storage device via a recording medium, such as a compact disc (CD) or a digital versatile disc (DVD), or via a communication path such as a network. As another example, the units of each of the image processing apparatus 10 and the terminal apparatuses 12 may be implemented through hardware resources, such as a processor, an electronic circuit, or an application specific integrated circuit (ASIC). A device such as a memory may be used in the implementation. Further, as another example, the units of each of the image processing apparatus 10 and the terminal apparatuses 12 may be implemented, for example, through a digital signal processor (DSP) or a field programmable gate array (FPGA).

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
receive an extraction-area image indicating an extraction area, the extraction area including a fill-in area in which a writer handwrites information; and
when an instruction to correct a recognition result for the information written in the fill-in area indicated by the extraction-area image is given, cause a display unit to display at least one different extraction-area image similar to the extraction-area image,
wherein, when the instruction for correction is given, the processor further corrects at least one different fill-in area in accordance with the correction, the at least one different fill-in area being indicated by the at least one different extraction-area image, wherein, in a case where the fill-in area is one in which it is assumed that writing is to be performed in a single-character frame, the processor corrects the at least one different fill-in area in accordance with the correction, and in a case where the fill-in area includes frames other than the single-character frame, ask a corrector whether or not the at least one different fill-in area should be corrected in accordance with the correction before the at least one different fill-in area is corrected for each different fill-in area.

2. The information processing apparatus according to claim 1, wherein the fill-in area is an area formed in a document, and wherein the processor searches, for the at least one different extraction-area image, images indicating a plurality of documents in which the writer has written information, and causes the display unit to display the at least one different extraction-area image.

3. The information processing apparatus according to claim 2, wherein the processor corrects the at least one different fill-in area in accordance with the correction on a basis of a confidence factor of a recognition result for information written in the at least one different fill-in area.

4. The information processing apparatus according to claim 2, wherein, when the instruction for correction is given, the processor corrects the at least one different fill-in area in accordance with the correction on a basis of an attribute of the fill-in area.

5. The information processing apparatus according to claim 1, wherein the processor searches a first image and a second image for the at least one different extraction-area image, and causes the display unit to display the at least one different extraction-area image, the first image indicating a first document in which the fill-in area is formed, the second image indicating a second document of a type identical to a type of the first document.

6. The information processing apparatus according to claim 5, wherein the processor corrects the at least one different fill-in area in accordance with the correction on a basis of a confidence factor of a recognition result for information written in the at least one different fill-in area.

7. The information processing apparatus according to claim 5, wherein, when the instruction for correction is given, the processor corrects the at least one different fill-in area in accordance with the correction on a basis of an attribute of the fill-in area.

8. The information processing apparatus according to claim 1, wherein the processor searches a first image and a second image for the at least one different extraction-area image, and causes the display unit to display the at least one different extraction-area image, the first image indicating a first document in which the fill-in area is formed, the second image indicating a second document generated in a time predetermined on a basis of a time when an image of the first document is generated.

9. The information processing apparatus according to claim 8, wherein the processor corrects the at least one different fill-in area in accordance with the correction on a basis of a confidence factor of a recognition result for information written in the at least one different fill-in area.

10. The information processing apparatus according to claim 8, wherein, when the instruction for correction is given, the processor corrects the at least one different fill-in area in accordance with the correction on a basis of an attribute of the fill-in area.

11. The information processing apparatus according to claim 1, wherein the processor corrects the at least one different fill-in area in accordance with the correction on a basis of a confidence factor of a recognition result for information written in the at least one different fill-in area.

12. The information processing apparatus according to claim 1, wherein, when the instruction for correction is given, the processor corrects the at least one different fill-in area in accordance with the correction on a basis of an attribute of the fill-in area.

13. A non-transitory computer readable medium storing a program causing a computer to execute a process comprising:

receiving an extraction-area image indicating an extraction area, the extraction area including a fill-in area in which a writer handwrites information; and when an instruction to correct a recognition result for the information written in the fill-in area indicated by the extraction-area image is given, causing a display unit to display at least one different extraction-area image similar to the extraction-area image, wherein, when the instruction for correction is given, correcting at least one different fill-in area in accordance with the correction, the at least one different fill-in area being indicated by the at least one different extraction-area image, wherein, in a case where the fill-in area is one in which it is assumed that writing is to be performed in a single-character frame, correcting the at least one different fill-in area in accordance with the correction, and in a case where the fill-in area includes frames other than the single-character frame, ask a corrector whether or not the at least one different fill-in area should be corrected in accordance with the correction before the at least one different fill-in area is corrected for each different fill-in area.

* * * * *